United States Patent

[11] 3,566,996

[72] Inventor Richard L. Crossman
 386 Mark Drive, Tallmadge, Ohio 44278
[21] Appl. No. 809,260
[22] Filed Mar. 21, 1969
[45] Patented Mar. 2, 1971

[54] AUTOMATIC BRAKE ADJUSTER
 7 Claims, 4 Drawing Figs.
[52] U.S. Cl. ............................................. 188/196,
 188/71.8
[51] Int. Cl. ..................................... F16d 65/54,
 F16d 55/10
[50] Field of Search ............................. 188/71.8,
 196 (P,R)

[56] References Cited
UNITED STATES PATENTS

| | | | |
|---|---|---|---|
| 1,825,555 | 9/1931 | Stern | 188/196(R)UX |
| 2,888,104 | 5/1959 | Frayer | 188/71.8 |
| 3,459,282 | 8/1969 | Hoenick et al. | 188/196 |
| 2,830,680 | 4/1958 | Hawley | 188/196 |

Primary Examiner—Duane A. Reger
Attorneys—F. W. Brunner and Paul E. Milliken

ABSTRACT: An automatic brake adjuster for use on disc brakes having a pressure plate axially movable with respect to the brake housing. The adjuster has a threaded pin with one end attached to the brake pressure plate with the threaded portion of the pin extending through an internally threaded gripping member which extends through the brake housing. The threaded portion of the internally threaded member is radially outwardly expandable to permit disengagement of the threaded portion of the member from the threaded pin thereby permitting the pin to be moved by the pressure plate axially with respect to the internally threaded member. As lining wear increases in the brake, the distance between the pressure plate and the brake housing increases and the threaded pin is moved farther and farther through the threaded member. The position of the threaded pin with respect to the brake housing determines the amount of spacing between the brake housing and the pressure plate and this in turn determines the amount of clearance in the brake.

*INVENTOR.*
RICHARD L. CROSSMAN
BY
*ATTORNEY*

AUTOMATIC BRAKE ADJUSTER

This invention relates to an automatic brake adjuster for use with disc type brakes. It utilizes a threaded pin having one end attached to a brake pressure plate and an internally threaded gripping means mounted on the brake housing and releasably engaging the threaded pin to permit adjustment of the brake by axial movement of the threaded pin and the pressure plate with respect to the brake housing.

BACKGROUND OF THE INVENTION

This brake adjuster is useful primarily in disc brakes and in particular, disc brakes of the type shown in U.S. Pat. No. 2,909,245 issued to J. A. Culbertson and U.S. Pat. No. 3,217,844 issued to J. P. Nelson et al. In brakes of the type shown in these two patents, the usual practice is to mount a plurality of brake adjusters in spaced relationship around the brake housing by mounting the adjusters in holes provided through the brake housing. An axially movable pin extends from each adjuster and fastens into a slot provided in the brake pressure plate. As may be seen in the two patents previously mentioned, the pressure plate is actuated by a force exerted by one or more hydraulically operated brake pistons which bear against the pressure plate when the brakes are applied and move it against a series of friction discs to provide a braking action.

OBJECTS OF THE INVENTION

A primary object of this invention is to provide a simple, inexpensive automatic brake adjuster which has a minimum of moving parts and which can easily be retrofitted into existing brake structures as well as newly manufactured brakes. This and other objects of the invention will become more fully apparent in the following specification and the accompanying drawings.

DESCRIPTION OF THE PREFERRED EMBODIMENT

Figure 1:
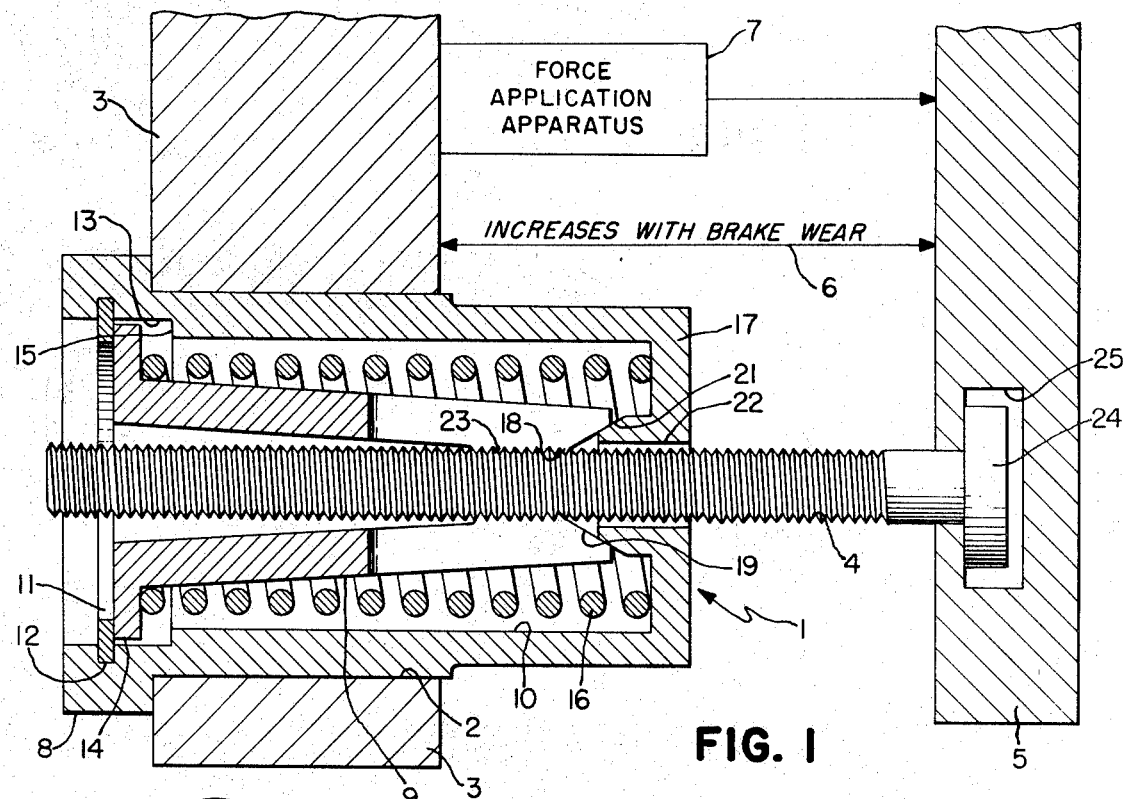
FIG. 1 is a cross-sectional view through the brake adjuster of the invention mounted in a brake housing and attached to a pressure plate.

Referring now to FIG. 1, a brake adjuster indicated generally by the numeral 1 is mounted in an opening 2 in a brake housing 3. The adjuster 1 carries a centrally located, externally threaded pin 4 which has one end fastened to a brake pressure plate 5. The brake pressure plate 5 is axially movable with respect to the brake housing 3 and upon application of the brakes, moves away from the housing 3 and bears against one or more friction discs of the brake to create a braking action as may be seen in either U.S. Pat. No. 2,909,245 or U.S. Pat. No. 3,217,844. As the brake friction surfaces continue to wear, the distance 6 between the brake housing 3 and the pressure plate 5 increases. Each time the brake is applied, a force application apparatus 7 mounted on the brake housing moves the pressure plate 5 away from the housing 3. The apparatus indicated schematically by the numeral 7 would normally be a brake piston actuated by hydraulic pressure. It is shown schematically merely for the purposes of simplicity since it does not form a part of this invention. The brake adjuster 1 has an adjuster housing 7 mounted in the opening 2 of the housing 3. The adjuster housing 7 is open at the end opposite the pressure plate 5 and closed at the end facing the pressure plate. The adjuster housing 7 has a radially outwardly extending flange 8 which engages the brake housing 3 and holds it in position within the opening 2. A tubular internally threaded gripping member 9 is positioned within the center bore 10 of the housing 7. A retaining ring 11 is positioned in an annular retaining groove near the open end of the housing 7. It may be seen in FIG. 1 that the center bore 10 has an enlarged diameter portion 13 near the open end of the adjuster housing 7. The tubular gripping member 9 has a radially outwardly extending flange 14 which extends into the enlarged diameter portion 13. It may be seen that when the gripping member 9 is positioned within the housing 7 and the retaining ring 11 is placed in position, the flange 14 lies between the retaining ring 11 and an annular step 15 formed by the change in diameter of the center bore 10 to the larger diameter portion 13. The flange 14 permits the tubular gripping member 9 to move axially for a limited distance in either direction. A spring 16 positioned within the housing 7 and surrounding the gripping member 9 bears against the closed end wall 17 of the housing 7 and against the flange 14 to urge the gripping member 9 toward the open end of the housing 7 where it is stopped by the retaining ring 11.

Figure 2:
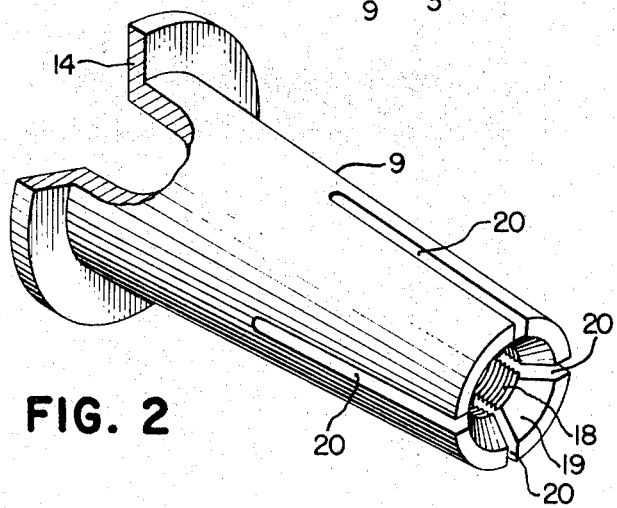
FIG. 2 is a perspective view of the internally threaded radially expandable gripping member of the brake adjuster with a portion broken away to better show the cross-sectional contour.

Referring now to FIG. 2 which better illustrates the shape of the tubular gripping member 9, it may be seen that the cross-sectional diameter of the member 9 decreases progressively from the end having the flange 14 to the opposite end which has an internally threaded hole 18. Immediately adjacent the threaded hole 18 is a frustoconically shaped surface which increases in diameter toward the end of the member 9. Four radial slots 20 are cut through the wall of the member 9 on the same end as the threaded hole 18. The slots 20 permit the threaded portion to expand radially outwardly as will be described later in the specification.

Figure 4:
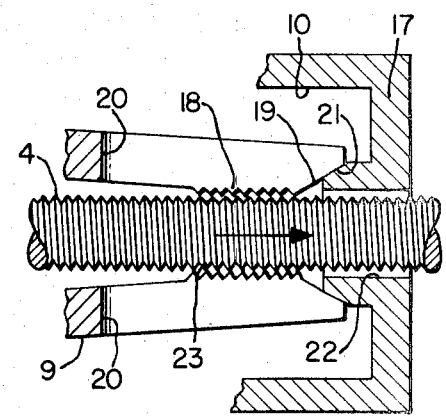
FIG. 4 is a fragmentary cross-sectional view similar to FIG. 3 but showing radial expansion of the gripping member when the brake is applied.
Figure 3:
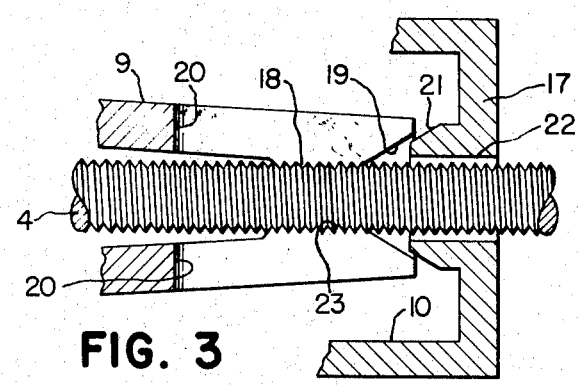
FIG. 3 is a fragmentary view of the adjuster shown in FIG. 1 with the gripping member engaging the threaded pin when the brake is in a released position.

Referring back to FIG. 1, the frustoconical surface 19 of the member 9 lies adjacent to a mating frustoconical surface 21 centrally located on the closed end wall 17 of the housing 7. The frustoconical surface 21 surrounds a centrally located hole 22 in the end wall 17. The hole 22 permits the threaded pin 4 to pass through the wall 17 and extend through the tubular gripping member 9 with the threaded portion 18 engaging the threads 23 of the pin 4. Pin 4 has an enlarged head 24 which engages an undercut slot 25 in the pressure plate 5. When the brake is in the released position with no force being applied to the pressure plate 5, the brake adjuster assumes the position shown in FIGS. 1 and 3 in which the spring 16 holds the gripping member 9 against the retaining ring 11. In this position, the member 9 is in its radially retracted position with the threaded hole 18 engaging a portion of the threads 23 on the pin 4. When the force application apparatus 7 moves the pressure plate 5 away from the housing 3, the pin 4 moves with the pressure plate 5 and carries with it the tubular gripping member 9 by overcoming the spring pressure of the spring 16. As the member 9 is moved toward the closed end of the housing 7, the frustoconical surface on the member 9 contacts the matching frustoconical surface 21 on the housing 7 resulting in a wedging action which causes radial expansion of the end portion of the member 9 having the threaded hole 18. This causes the diameter of the hole 18 to expand sufficiently to release the threads 23 of the pin 4 and permit the pin 4 to continue to move axially with the pressure plate 5 until it stops against the brake friction discs while at the same time, the gripping member 9 moves no further in the axial direction. The result of this action, as illustrated in FIG. 4, is that the relative axial position of the pin 4 and the member 9 is changed because of the slipping of the threads when the threaded hole 18 is radially expanded. Each time the brakes are applied and there is an increase in wear of the friction surfaces, the pin 4 moves axially with respect to the housing 3 a sufficient distance to adjust the unbraked position of the pressure plate 5 so that a constant clearance is maintained between the pressure plate and the brake friction elements.

Whenever new brake linings or friction elements are placed in the brake, the adjuster 1 may be readjusted merely by screwing the threaded pin to the desired position within the gripping member 9. It will be understood that any number of these adjusters may be used on a particular brake depending upon the size and other requirements. It should be understood that various minor modifications in the various working parts of this adjuster may be made without departing from the scope of the invention. Various means may be employed for attaching the threaded pin to the pressure plate and various types of springs may be used to move the gripping member within the housing. It is also contemplated within the scope of the invention that other means of mounting the gripping member within the brake housing may be used.

I claim:

1. In an automatically adjustable disc brake, the combination of:
   a. a brake housing;
   b. a pressure plate;
   c. pressure means attached to the housing and operatively associated with the plate to cause movement of the plate away from the housing upon actuation of said pressure means; and
   d. at least one adjuster separate from the pressure means attached to the housing and the pressure plate comprising:
      1. a threaded member having one end attached to the pressure plate,
      2. radially expandable threaded gripping means attached to the brake housing and engaging the threaded member for limited axial movement therewith, but adapted to release the member for further axial movement upon each application of the brake.

2. An automatically adjustable brake as claimed in claim 2 wherein the gripping means comprises:
   a. an adjuster housing;
   b. an internally threaded tubular member slidably mounted for limited movement within the housing; and
   c. means urging the tubular member toward one end of the adjuster housing when the brake is released but permitting it to move to the opposite end when the brake is applied.

3. An automatically adjustable brake as claimed in claim 2 wherein a tapered surface on the adjuster housing engages a mating tapered surface on the tubular member to provide a wedging action which causes radial expansion of the threaded portion of the tubular member.

4. An automatic brake adjuster as claimed in claim 3 wherein the tubular member has a plurality of radial slots to permit radial expansion thereof.

5. An automatic brake adjuster for use in a disc brake having a housing and a pressure plate movable with respect to the housing and a force means to move the pressure plate away from the housing when the brake is applied, the adjuster comprising:
   a. a threaded pin having one end attached to the pressure plate;
   b. a gripping member having an internally threaded portion for engaging the pin;
   c. an adjuster housing attached to the brake housing in spaced apart relationship from the force means and enclosing the gripping member but permitting limited sliding movement thereof;
   d. spring means within the adjuster housing urging the gripping member toward one end of the adjuster housing when the brake is released; and
   e. the threaded portion of the gripping member being radially outwardly expandable to permit disengagement thereof from the threaded pin to permit the pin to slide axially with respect to the gripping member each time the pressure plate is moved away from the brake housing when the brake is applied.

6. An automatic brake adjuster as claimed in claim 5 wherein both the gripping member and the adjuster housing have mating frustoconical surfaces and wherein the frustoconical surface of the adjuster housing creates a wedging action against the frustoconical surface of the gripping member to cause radially outward expansion of the threaded portion each time the brake makes an adjustment for wear.

7. An automatic brake adjuster as claimed in claim 6 wherein the gripping member has a plurality of radial slots in the threaded portion to permit radial expansion thereof.

PO-1050
(5/69)

UNITED STATES PATENT OFFICE
CERTIFICATE OF CORRECTION

Patent No. 3,566,996    Dated    March 2, 1971

Inventor(s)   Richard L Crossman

It is certified that error appears in the above-identified patent and that said Letters Patent are hereby corrected as shown below:

In the legend, after "Patented Mar. 2, 1971", please add the following:

--(73) Assignee   The Goodyear Tire & Rubber Company
                  Akron, Ohio
                  a corporation of Ohio--

Signed and sealed this 24th day of August 1971.

(SEAL)
Attest:

EDWARD M. FLETCHER, JR.
Attesting Officer

WILLIAM E. SCHUYLER, JR.
Commissioner of Patents